US 010918258B2

(12) United States Patent
Adams

(10) Patent No.: US 10,918,258 B2
(45) Date of Patent: Feb. 16, 2021

(54) HANDHELD DUST-REMOVING DEVICE

(71) Applicant: Cynthia Adams, Meadville, MS (US)

(72) Inventor: Cynthia Adams, Meadville, MS (US)

(*) Notice: Subject to any disclaimer, the term of this patent is extended or adjusted under 35 U.S.C. 154(b) by 0 days.

(21) Appl. No.: 16/251,840

(22) Filed: Jan. 18, 2019

(65) Prior Publication Data

US 2020/0229670 A1    Jul. 23, 2020

(51) Int. Cl.
| A47L 5/14 | (2006.01) |
| A47L 13/38 | (2006.01) |
| A47L 9/14 | (2006.01) |
| B01D 41/00 | (2006.01) |
| A47L 5/24 | (2006.01) |

(52) U.S. Cl.
CPC ............... *A47L 13/38* (2013.01); *A47L 5/14* (2013.01); *A47L 9/149* (2013.01); *A47L 5/24* (2013.01); *B01D 41/00* (2013.01)

(58) Field of Classification Search
CPC ............... A47L 5/14; A47L 9/149; A47L 5/24
See application file for complete search history.

(56) References Cited

U.S. PATENT DOCUMENTS

| 5,065,473 A  * | 11/1991 | Krasznai ................... A47L 5/24 |
| | | 15/339 |
| 2009/0044372 A1* | 2/2009 | Knopow ................... A47L 5/14 |
| | | 15/345 |
| 2009/0172912 A1* | 7/2009 | Knopow ............ A46B 15/0002 |
| | | 15/344 |
| 2009/0229070 A1* | 9/2009 | Medema .................... A47L 5/24 |
| | | 15/344 |
| 2009/0241285 A1* | 10/2009 | Hinklin .................. A01G 20/47 |
| | | 15/330 |
| 2015/0143657 A1* | 5/2015 | Gindele .................... A47L 5/14 |
| | | 15/330 |
| 2018/0015612 A1* | 1/2018 | Price .......................... B25J 1/04 |
| 2018/0132688 A1* | 5/2018 | Walker ...................... A47L 5/24 |

* cited by examiner

*Primary Examiner* — Michael D Jennings
(74) *Attorney, Agent, or Firm* — The Iwashko Law Firm, PLLC; Lev Ivan Gabriel Iwashko

(57) ABSTRACT

A handheld dust-removing device, including a main body to remove at least one particle of dust disposed on a surface of an air conditioning filter, and a handle at least partially disposed within at least a portion of the main body to allow a user to move the main body across the surface of an air conditioning filter to remove the at least one particle of dust.

1 Claim, 1 Drawing Sheet

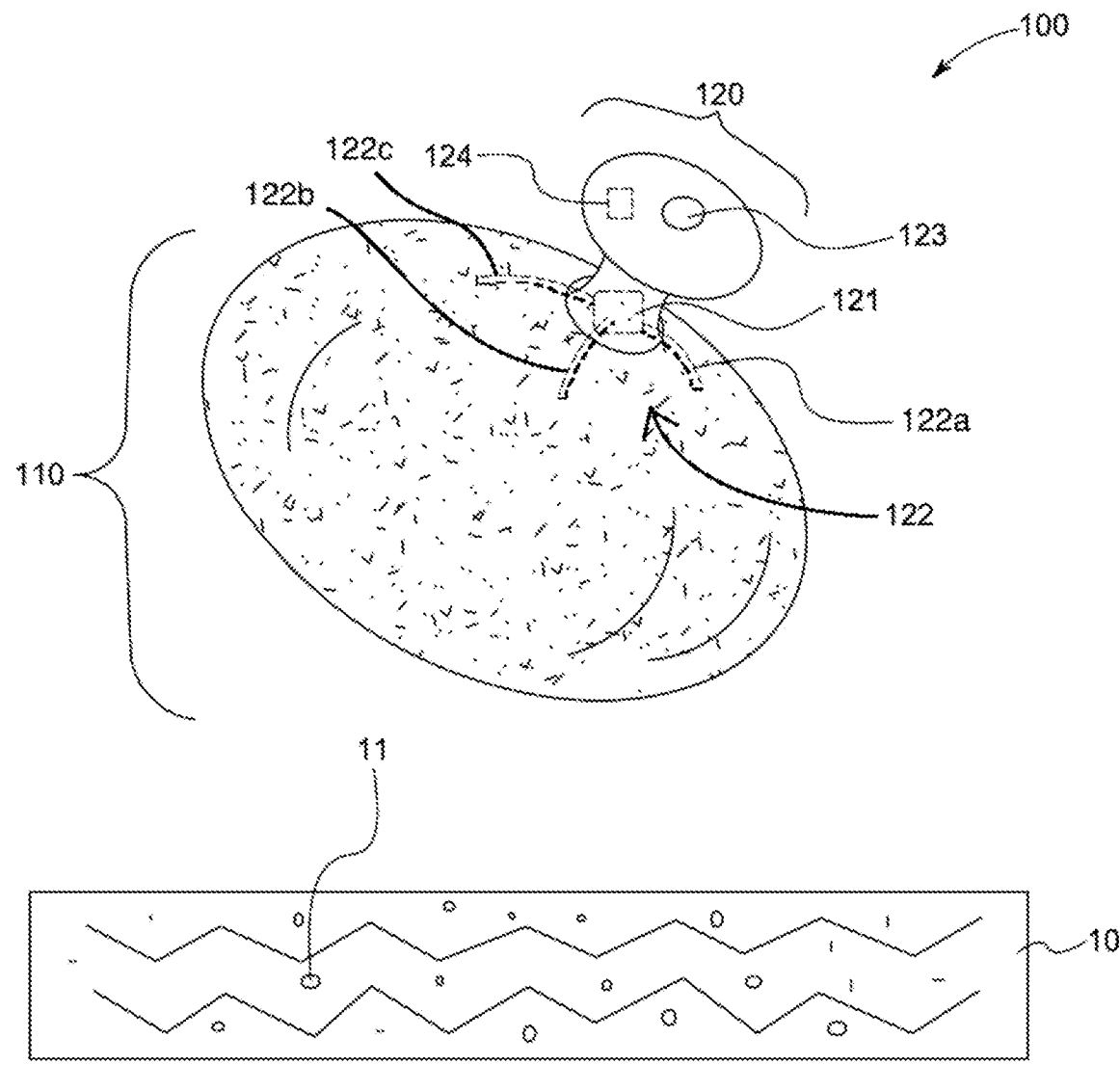

HANDHELD DUST-REMOVING DEVICE

BACKGROUND

1. Field

The present general inventive concept relates generally to a dust-removing device, and particularly, to a handheld dust-removing device.

2. Description of the Related Art

Dust is a common problem for many people. In general, dust is composed of multiple particles of different objects, such as dirt, pollen, hair, textile fibers, etc. As such, dust is easily carried by air and often settles on a wide range of objects, including air conditioner filters.

For most individuals, dusting can be a tedious task many try to avoid. Currently, on the market, there are dusting products for specific objects, such as a table or a shelf, but these dusting products are limited in their effectiveness for air conditioner filters, due to the risk of tearing the air conditioner filter.

Therefore, there is a need for a gentler handheld dust-removing device.

SUMMARY

The present general inventive concept provides a handheld dust-removing device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a handheld dust-removing device, including a main body to remove at least one particle of dust disposed on a surface of an air conditioning filter, and a handle at least partially disposed within at least a portion of the main body to allow a user to move the main body across the surface of an air conditioning filter to remove the at least one particle of dust.

The handle may include a motor disposed within at least a portion of the handle, and at least one rod to connect the motor to the main body to manipulate the main body in response to a movement of the motor.

The movement of the motor may be at least one of a reciprocal movement, a vibrating movement, and a spinning movement.

The handle may further include a button.

The motor may cause the main body to vibrate in response to a first press of the button to destabilize the at least one particle of dust attached to the air conditioning filter.

The motor may cause the main body to rotate in response to a second press of the button to increase a surface area of the main body that is in contact with the outer surface of the air conditioning filter.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

The sole figure illustrates an isometric view of a handheld dust-removing device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

The sole figure illustrates an isometric view of a handheld dust-removing device, according to an exemplary embodiment of the present general inventive concept.

The handheld dust-removing device 100 may be constructed from at least one of metal, plastic, glass, wood, and rubber, etc., but is not limited thereto.

The handheld dust-removing device 100 may include a main body 110 and a handle 120, but is not limited thereto.

The main body 110 may be constructed from at least one of microfiber, lambswool, and electrostatic cloth, etc., but is not limited thereto. Also, the main body 110 may be constructed from any material that may maximize attraction of dust particles, such that the handheld dust-removing device 100 acts as a superior dust removal and cleaning device.

The main body 110 may be of any shape, as it is a flexible, malleable piece of cloth.

The handle 120 may include a motor 121, a plurality of rods 122, a button 123, and a battery 124, but is not limited thereto.

The plurality of rods 122 may include a first rod 122a, a second rod 122b, and a third rod 122c, but is not limited thereto.

The motor 121 may be disposed within at least a lower portion of the handle 120. The plurality of rods 122 may be disposed on at least a portion of the motor 121, such that a distal end for the first rod 122a, the second rod 122b, and the third rod 122c extends into at least a portion of the main body 110. The plurality of rods 122 may be of a predetermined length that extends from the motor 121 to a distal portion within the main body 110. Furthermore, any movement of the motor 121 causes the plurality of rods 122 to move in response thereto. As such, the plurality of rods 122 may manipulate the main body 110 in response to a movement of the motor 121.

The movement of the motor 121 may be at least one of a reciprocal movement, a vibrating movement, and a spinning movement.

For example, the user may press the button 123 on the handle 120, such that the motor 121 causes the plurality of rods 122 to vibrate in response to a first press of the button 123. As such, the main body 110 may vibrate in response to the vibration of the plurality of rods 122. Specifically, the main body 110 may vibrate to destabilize the at least one particle of dust that may be attached to the air conditioning filter 10.

The user may press the button 123 on the handle 120, such that the motor 121 causes the plurality of rods 122 to rotate in response to a second press of the button 123. As such, the main body 110 may rotate in response to the rotation of the plurality of rods 122. Moreover, the main body 110 may rotate in a direction to increase a surface area of the main body 110 that is in contact with the outer surface of the air conditioning filter 10. Specifically, a larger portion of the main body 110 may remove the at least one particle of dust 11 in response to the main body 110 being rotated.

The user may press the button 123 on the handle 120, such that the motor 121 is turned off in response to a third press of the button 123. As such, the plurality of rods 122 may no longer move.

The battery 124 may include lithium-ion, nickel cadmium, nickel metal hydride, alkaline, etc., but is not limited thereto.

The battery 124 may be disposed within at least an interior portion of the handle 120. The battery 124 may be a power source for operation of the handheld dust-removing device 100.

Although the motor 121, the plurality of rods 122, the button 123, and the battery 124 are described to be disposed within the handle 120, any or all of the motor 121, the plurality of rods 122, the button 123, and the battery 124 may alternatively be disposed fully and/or partially within the main body 110.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A handheld dust-removing device, comprising:
   a main body to remove at least one particle of dust disposed on a surface of an air conditioning filter; and
   a handle at least partially disposed within at least a portion of the main body to allow a user to move the main body across the surface of an air conditioning filter to remove the at least one particle of dust, the handle comprising:
   a motor disposed within at least a portion of the handle, and
   a plurality of rods to connect the motor to the main body to manipulate the main body in response to a movement of the motor, the plurality of rods comprising:
   a first rod disposed on a first side of the motor to curvedly extend away from the first side of the motor with respect to a first direction,
   a second rod disposed on a second side of the motor to curvedly extend away from the second side of the motor with respect to a second direction opposite to the first direction, and
   a third rod disposed on a third side of the motor to curvedly extend away from the third side of the motor with respect to a third direction.

* * * * *